(No Model.)

E. J. GILPIN.
REMOVABLE HANDLE FOR SAUCEPANS.

No. 569,635. Patented Oct. 20, 1896.

WITNESSES
O. C. Winge
C. Sedgwick

INVENTOR
E. J. Gilpin
BY
ATTORNEYS

UNITED STATES PATENT OFFICE.

ELI J. GILPIN, OF FOWLER, INDIANA.

REMOVABLE HANDLE FOR SAUCEPANS.

SPECIFICATION forming part of Letters Patent No. 569,635, dated October 20, 1896.

Application filed February 19, 1896. Serial No. 579,835. (No model.)

*To all whom it may concern:*

Be it known that I, ELI J. GILPIN, a citizen of the United States, and a resident of Fowler, county of Benton, and State of Indiana, have invented certain new and useful Improvements in Removable Handles, of which the following is a specification, reference being had to the accompanying drawings, forming a part thereof, in which similar letters of reference indicate corresponding parts.

This invention relates to improvements in removable handles for saucepans, baking-dishes, &c., and has for its object to provide an article of this character which will be adaptable for handling hot dishes of variable diameter.

The device will comprise few and simple parts, and it will be readily attachable and detachable to and from pans, &c., and it will be inexpensive and durable.

The invention will be hereinafter fully described, and specifically set forth in the annexed claims.

Figure 1:
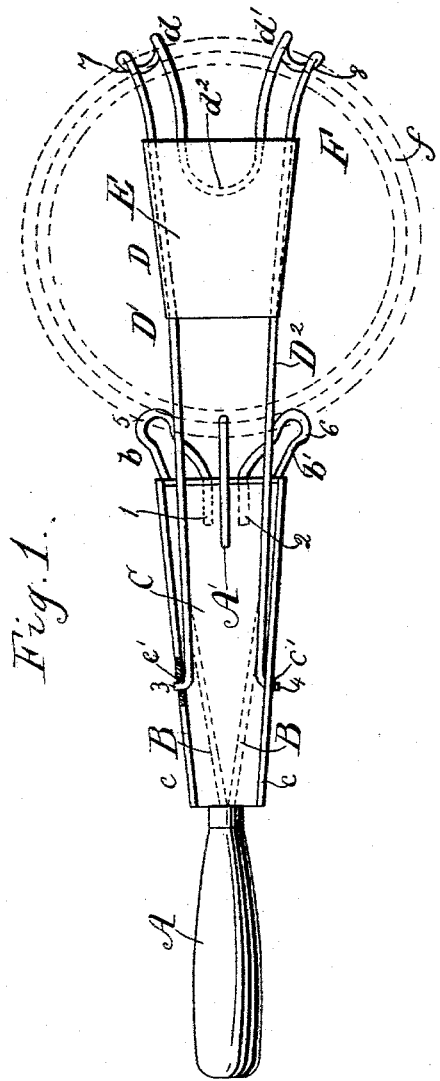
Figure 2:
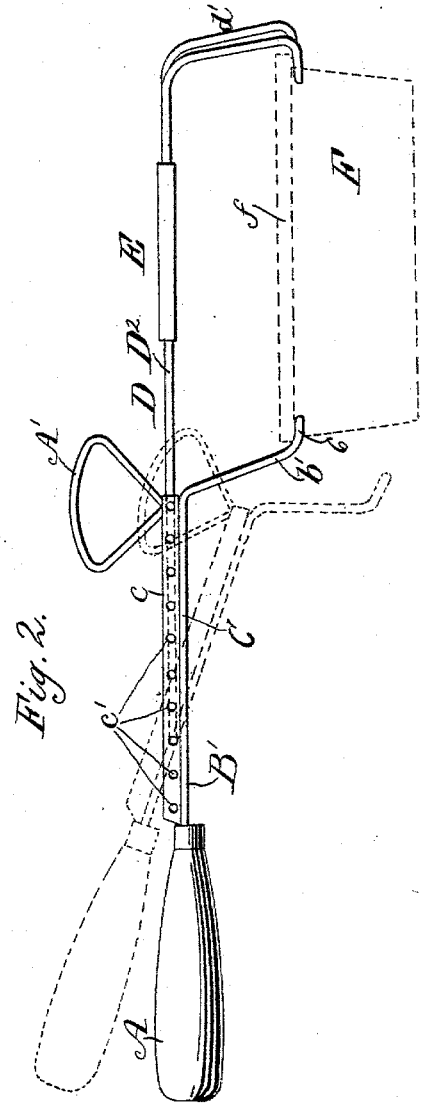

In the accompanying drawings, forming part of this specification, Figure 1 is a plan view of my improved device having a saucepan attached thereto, and Fig. 2 is a side elevation thereof.

In constructing the device I provide, primarily, a handle A, which has attached thereto two projecting arms B and B', which said arms are projected downwardly at their outer ends into depending prongs $b$ and $b'$, which prongs are extended at their upper ends into rearwardly-projected arms 1 and 2.

Soldered to the arms B and B' and also to the arms 1 and 2 is an angular plate C, which has projected upon its edges right-angle flanges $c$, which flanges are provided with apertures $c'$, adapted to engage with a clamping device D, which comprises two spring-arms D' and D², which said arms are provided at their respective ends with fingers 3 and 4, which engage with the apertures $c'$ of the flanges $c$.

The arms D' and D² are projected at their outer end into depending prongs $d$ and $d'$, which said prongs at their upper ends are projected into a rearwardly-extended loop $d^2$. Soldered to this loop and to the spring-arms D' and D² is a strengthening-plate E, which provides a connection between the two said arms D' and D².

The prongs $b$, $b'$, $d$, and $d'$ are provided, respectively, with horizontally-projected loops 5, 6, 7, and 8, which loops are adapted to engage with the under surface of a flange $f$ of any suitable pan or dish.

In the operation of the device the spring-arms D' and D² are adjusted to any two opposing apertures $c'$ of the flanges $c$ of the plate C. The handle portion of the device is then rotated into a position approximating the dotted lines in Fig. 2, and the prongs $d$ and $d'$ are brought into engagement with the flange $f$ of the pan. The handle portion is then brought into a horizontal position, whereby its prongs $b$ and $b'$ will also engage with a flange $f$, thus securely fastening or clamping the pan, which pan can then be readily and safely handled by means of the handle A of the device.

To strengthen the article, it is supplied at its inner end with an auxiliary handle A', which will be used in combination with the handle A when moving pans or dishes of large diameter.

I do not confine myself to the specific details of construction as herein described, as it is obvious that under the scope of my invention I am entitled to make slight modifications of construction.

Having thus described my invention, what I claim as new, and desire to secure by Letters Patent, is—

1. A removable handle for saucepans, &c., comprising a handle proper having two arms projected therefrom which terminate in depending prongs, and a plate having apertured flanges thereon, and two longitudinally-adjustable spring-arms having depending prongs thereon, said arms having fingers upon their ends which engage with the apertures of the said flanges, substantially as shown and described.

2. In a removable handle for pans, &c., the combination of a longitudinally-adjustable clamp comprising spring-arms having fingers and depending looped prongs thereon, and a handle proper having two looped prongs depending therefrom which prongs lead downwardly and an angular plate having apertured flanges thereon, substantially as shown and described.

3. In a removable handle for pans, &c., the combination with an angular plate having apertured flanges projected from the edges thereof, clamping-prongs depending therefrom and a handle attached thereto, of an adjustable clamp comprising two attached spring-arms having fingers thereon and prongs depending therefrom, substantially as shown and described.

In testimony that I claim the foregoing as my invention I have signed my name, in presence of two witnesses, this 14th day of February, 1896.

ELI J. GILPIN.

Witnesses:
JOHN LOCKHART,
GEORGE G. WILLIAM.